Sept. 1, 1953  J. R. CLARK, JR., ET AL  2,650,793
VALVE
Filed Sept. 25, 1950

INVENTORS.
RALPH W. JAMES,
JAMES RUSSELL CLARK, JR.
BY
ATTORNEY.

Patented Sept. 1, 1953

2,650,793

UNITED STATES PATENT OFFICE 2,650,793

VALVE

James R. Clark, Jr., and Ralph W. James, Pasadena, Calif., assignors to Loyola University Foundation, Los Angeles, Calif., a nonprofit corporation of California Application September 25, 1950, Serial No. 186,522

10 Claims. (Cl. 251—144)

This invention relates to an improved valve, and more particularly to an improved check valve adapted to be installed in a fluid line and responsive to minute changes in pressure for effectively providing a bubble-tight seal.

The construction of prior proposed check valves usually included a rather large number of movable parts in order to effect a seal in response to back pressure in a fluid line. Prior check valves were not immediately responsive to pressure changes because of the weight of the moving parts, because of close tolerances between the parts of the valve and because of a tendency to stick or bind under certain conditions. Any foreign matter carried by the fluid in the line might render a check valve of prior construction inoperative. Prior construction of check valves characterized by axially movable valve elements were not capable of effecting a tight seal in response to pressure changes or differentials on the order of two ounces per square inch or less and normally some fluid was returned through the check valve before the check valve was operated by the back pressure to provide a seal.

It is therefore a primary object of this invention to design and provide an improved check valve which will obviate the disadvantages of prior check valves and which is effectively responsive to minute changes in pressure in a gas or liquid line.

An object of this invention is to provide a check valve wherein a movable valve poppet is arranged for a relatively wide range of freedom of movement, both laterally and angularly, with respect to the valve body so as to avoid sticking or binding of the poppet in operation and to afford a poppet immediately responsive to minute changes in pressure.

Another object of this invention is to design and provide an improved check valve characterized by a valve poppet operable within the valve body in loosely fitting relation and yet effective to afford a tight seal in response to minute changes of pressure.

A further object of this invention is to provide an improved check valve which is of simple construction, of a minimum number of moving valve parts, and which is inexpensive to manufacture.

Still another object of this invention is to provide an improved check valve wherein a tight seal is provided when the valve is in closed position by seating engagement of a circular knife edge carried by a poppet upon a convex radially outwardly and forwardly directed circular face provided on a resilient yieldable seating ring positioned on the inlet portion of the valve within the valve body and removed from the path of flowing fluid through the valve.

Generally speaking, the improved check valve contemplated by this invention is responsive to minute pressure changes for example, .02 to .03 lb. per sq. inch. To provide a construction capable of being responsive to such pressure changes, this invention contemplates a spring-biased valve poppet having a tubular skirt of relatively lightweight section received within the inner end of an axially bored valve inlet portion for relatively free movement therewithin. The poppet is provided with a head closing the forward end of the tubular skirt and said skirt is provided with ports adjacent the head for flow of fluid therethrough when in open position. The head of the poppet is made of relatively heavy section, as compared to the poppet skirt, and the poppet skirt is provided with a rearwardly and inwardly tapered outer surface which enables the poppet to freely move both laterally and angularly with respect to the inlet body portion. To effect a seal, the head of the poppet is provided with a rearwardly directed circular lip having a rearwardly directed circular knife edge adapted to seat on a convex radially outwardly and forwardly directed zone of a circular seating ring of resilient yieldable material carried on the inlet portion. The knife edge is provided with a diameter greater than the inner diameter of the most forwardly directed circular elements of the seating ring so that when angular displacement of the poppet occurs in the inlet portion the circular knife edge will contact the convex zone of the seating ring as if contacting a spehrical zone so as to provide a bubble-tight seal by contact or slight embedding of the knife edge in the resilient seating ring.

Other objects and advantages of this invention will be readily apparent from the following description of the drawings.

Figure 1:
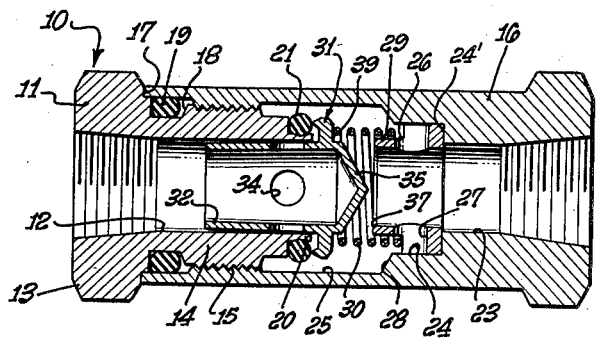
Fig. 1 is a longitudinal sectional view of a check valve embodying this invention.

The check valve shown in Fig. 1 comprises a separable valve body, generally indicated at 10, adapted to be installed in a fluid carrying line. The valve body 10 comprises an inlet male portion 11 having an inlet axial bore 12 internally threaded at its outer end to afford connection to a fluid line. The inlet portion 11 includes an enlarged head 13 and a shank 14 of reduced diameter. Intermediate its ends, shank 14 may be provided external threads affording threaded engagement at 15 with an internally threaded hollow discharge female portion 16 into which shank 14 extends. The discharge portion 16 extends rearwardly (toward the inlet side of the valve) beyond the threaded connection 15 for seating, as at 17, on head 13. The head 13 and the external threads on shank 14 define therebetween an annular groove 18, carrying a suitable circular sealing gasket 19 cooperating with the extension of the discharge portion to afford a seal between the separable portions of the valve body.

The shank 14 is provided with a reduced inner end 20 forming an annular recess for carrying a circular valve seating ring or torus 21, said ring being shown as having a circular transverse cross-section. The recess may have an axial depth of approximately the cross-sectional diameter of the ring 21. A relatively shallow dished groove 22 may be provided on reduced end 20 for positioning and holding the seating ring 21, said ring being adapted to be forced over end 20 and adjusted into position in groove 22 so as to be under virtually uniform stress. The seating ring 21 includes a radially outwardly and forwardly directed convex circular face or zone 21a extending between the most forwardly located circular element of ring 21 and the outermost circumferential element of the ring. The seating ring 21 is preferably formed of a suitable resilient elastic material of rubber, rubber-like composition or synthetic rubber compositions, capable of withstanding disintegration by liquids and fluids which might be carried in the fluid line in which the valve is used.

The hollow discharge portion 16 is provided with a discharge bore 23 internally threaded at its outer end for connection to a fluid line. Inwardly bore 23 is provided with progressively stepped enlarged hollow chambers 24 and 25. The enlarged chamber 24 forms a shoulder 24' with bore 23 to provide seating for an axially bored valve member or a spring guide member 26 having an interference or press fit within chamber 24. The member 26 may be provided with side ports or passageways 27 arranged to communicate with chamber 25 and the bore 23 when the valve is in open position. The total flow area provided by passageways 27 is at least equivalent to the flow area provided by either the inlet bore or discharge bore, the flow area of each bore being virtually the same.

Chamber 25 is provided with generally cylindrical internal surfaces merging with the internal threads of the discharge portion 16 which engage the inlet portion. The internal diameter of chamber 25 is greater than the outer diameter of ring 21 for spacing the surfaces of the chamber therefrom.

The member 26 includes an inwardly directed annular boss 29 providing positioning means for an end of a coil spring 30, said end of the spring being seated on portions of a shoulder through which passageways 27 communicate with chamber 25.

Figure 2:
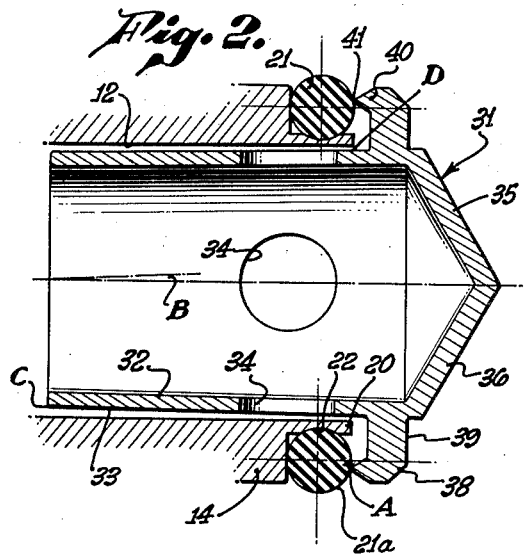
Fig. 2 is an enlarged fragmentary sectional view showing the seating of a valve poppet on a seating ring as shown in the check valve in Fig. 1.

An axially movable hollow valve element or poppet 31 may be provided with a cylindrical skirt 32 of light weight section extending within the inlet bore 12 in loosely fitting relationship. The skirt comprises a virtually cylindrical wall 33 provided with an outer slightly frusto-conical surface rearwardly and inwardly tapered toward the inlet side of the valve, said skirt having an open end in communication with the inlet bore. The wall 33 may be provided with a plurality of circular outlet ports 34 arranged to be covered by internal marginal surfaces of the inner end of the inlet portion when the poppet is in closed position, as shown in Fig. 2. The total flow area provided by ports 34 is at least equal to the flow area of the inlet bore; thus the area of ports 34 and passageways 27 provide full flow of fluid through the valve.

The poppet 31 is provided with a head 35 of heavier section than that of the skirt 32 and having an end wall 36 closing the inner end of the poppet, said end wall having a conical forwardly directed end face adapted to be partially received within the opposed end of the axially bored valve member 26 when the poppet is in fully open or surge position. The inner rearwardly directed edge of member 26 may be slightly beveled, as at 37, to facilitate seating of the end face of all the poppets thereagainst.

The head 35 is also provided with a radially outwardly directed flange or extension 38 lying in a plane transverse to the axis of the poppet and affording an annular seat, as at 39, for the other end of spring 30, said spring biasing the poppet rearwardly against the seating ring 21. The outwardly directed flange 38 is provided with a rearwardly directed circular lip 40 of tapered cross-section terminating in a rearwardly directed circular knife edge 41. The knife edge lies in a plane transverse to the axis of the poppet and is adapted to contact the circular convex face 21a of the seating ring 21 in bubble-tight relation in response to minute changes in pressure in the fluid line.

The cooperative seating and sealing arrangement of the knife edge and seating ring 21 should be particularly noted. In this illustration the diameter of the circular knife edge is slightly greater than the mean diameter of ring 21, this difference in diameter being indicated in Fig. 2 by the radial difference A. The radial difference A may be defined by a tangential contact of a plane transverse to the axis of the ring on the most forwardly directed portions of the ring and a circular line of contact of the knife edge 41 on convex face 21a when the axis of the poppet coincides with the axis of the ring. In this example, the tangential contact of the transverse plane has a diameter equivalent to the mean diameter of said ring.

The loose fit of the poppet skirt within the inlet bore allows angular displacement of the axis of the poppet with respect to the axis of the ring or of the inlet bore. Maximum angular displacement, indicated by angle B, occurs when point C on the outer edge of the opened inlet end of the poppet skirt contacts the wall of the inlet bore 12 and when a diametrically opposite point D on wall 33 just rearwardly of flange 38 contacts the inner edge of end 20. Under this condition of maximum angular displacement, the radial difference A is sufficiently great so that all points on the knife edge 41 will seat on convex face 21a of the ring radially outwardly from a circle formed by the most forwardly directed circular element of the ring, or, in this example, a circle having the mean diameter of the ring.

Figures 4, 5, 6:
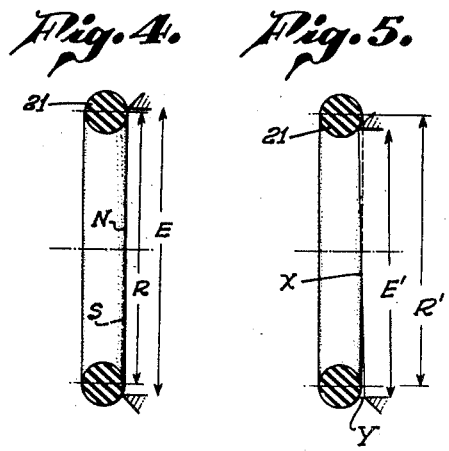
Fig. 4 is a fragmentary sectional view of a sealing ring and knife edge of the valve poppet shown in Fig. 2.
Fig. 5 is a view of a sealing ring and valve poppet seated thereagainst illustrating an inoperable arrangement when the diameter of the knife edge of the valve poppet is less than the mean diameter of the seating ring.
Fig. 6 is a diagrammatic end view showing the circular line of contact of the knife edge of the illustration in Fig. 5.

Fig. 4 illustrates a relative position of a circular knife edge and a seating ring under a condition of angular displacement when the diameter E of the circular knife edge is greater than the mean diameter R of the ring. The most forward portion of the ring in circular tangential contact with a plane transverse to the axis of the ring is indicated by a solid line N of the ring. The circular line of contact of the knife edge is indicated by the dashed line S. It will be readily apparent that the circular sealing line of contact of the knife edge is at all points radially outwardly of the tangential line of contact N and thus the knife edge will uniformly seat on the radially forwardly and outwardly directed convex face 21a of the ring for circular sealing contact.

The importance of having a knife edge of greater diameter than the mean diameter of a ring upon which it may seat is illustrated in Fig. 5 and Fig. 6 wherein a knife edge is provided with a diameter E' which is slightly less than the mean diameter R' of the ring. The mean circle of the ring having diameter A' is indicated at T (Fig. 6) and the circular line of contact of the knife edge is indicated at O. It will be readily noted that the circular line of contact O of the knife edge crosses the most forwardly directed portion of the ring or circle T at two points indicated by X. Thus it is impossible for the knife edge to provide circular sealing contact with the ring because a portion of the knife edge will be spaced from the ring, as indicated at Y of Fig. 5. It will thus be apparent from the above explanation that the diameter of the knife edge of a poppet employed in this invention must be greater than the mean diameter of a circular sealing ring cooperable therewith, or in general, must have a greater diameter than the diameter of the inner circumference of a radially outwardly and forwardly directed convex surface, an example of which is illustrated and described later in Fig. 3.

Because of the loose fit of the poppet skirt within the inlet bore and a heavier construction of head 31, the poppet tends to readily drop into closed position in response to minute changes of pressure in the fluid line. In closed position the knife edge is slightly embedded along a circular line on a virtually circular forwardly and outwardly facing convex zone on face 21a of the seating ring 21. Since the radius of curvature of the spherical zone is relatively great with respect to the radius of the knife edge, the knife edge will, in any of its closed positions, form a seal by slight embedding of the edge in the resilient ring 21.

The construction of the poppet, that is, the tapered light section skirt and heavy section head should be particularly noted because this construction facilitates immediate response to minute changes of pressure in the fluid line. The loose-fitting tapered skirt cooperates with the inlet bore to limit lateral movement of the poppet within the inlet bore. Even when the valve is operating in positions other than vertical, this valve construction facilitates the making of a virtually perfect seal between the knife edge and the convex seating zone.

The tapered skirt also serves to reduce to a minimum frictional resistance between the poppet and the inlet bore and thus contributes to the responsiveness of the poppet to extremely low pressures. When the valve poppet is in open position, it should be noted that the increase in clearance between the outer tapered end of the skirt and the inner end opening of the inlet bore serves to allow scavenging and removal of foreign matter from the inlet bore. Thus, such foreign matter which is normally found in commercial fluids and which would affect the responsiveness of the poppet to very low pressures because of increased frictional resistance is thus removed and cleaned from the bore.

When fluid passes through the check valve from the inlet side to the discharge side, poppet 31 is movable forwardly until in maximum open position the conical end face of head 35 seats against the valve element 26 as above described. In this position poppet 31 permits flow of fluid through the check valve, said fluid passing through ports 34 and passageways 27 into the discharge bore 23. When flow of fluid is stopped or when a change in pressure occurs on the discharge side of the valve, the rearwardly biased poppet moves axially in the inlet bore for covering the ports 34 and for sealing flow of fluid between the inlet and discharge portions by circular seating of the knife edge carried by the poppet against the seating ring 21. The knife edge and seating ring are cooperable for any position of the poppet to provide a bubble-tight seal.

Figure 3:
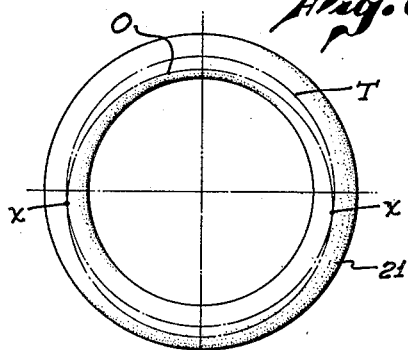
Fig. 3 is a modification of the valve poppet and seating ring associated therewith.

In Fig. 3 a different modification of a resilient seating ring and cooperable circular knife edge carried by a poppet is illustrated. In this modification poppet 31' comprises a skirt 32' having a rearwardly and inwardly tapered outer surface, said skirt being received within the inner end 20' of an inlet bore 12'. The skirt 32' includes circular outlet ports 34' covered by internal margins of the inner end 20' when the poppet is in closed position.

The poppet 31' includes a head 35' closing the forward end of the skirt 32', said head having a conical outer end face 36' and an internal conical recess 45. The head 35' is provided with a radially outwardly directed extension 38' projecting beyond the outer diameter of the skirt 32'. The extension 38' is provided with a rearwardly directed circular lip 40' having a radially inwardly flaring face 46 and an internal cylindrical face 47 converging with face 46 to form a rearwardly directed knife edge 41'.

The inner end 20' is provided with an annular recess 47 adapted to carry a circular sealing ring 48 suitably bonded or secured to the walls of the recess 47. The ring 48 presents a radially outwardly and forwardly directed convex circular face 49 upon which the knife edge 41' may seat in closed position for sealing engagement therewith. The sealing ring 48 having the convex face 49 may be formed as by coring out a sphere along a diameter by passing a cylinder therethrough and then cutting off a segment as by passing a plane therethrough perpendicular to the diameter to provide a circular spherical zone. Preferably the radius of the sphere from which the zone is formed should be substantially greater than the radius of the circular knife edge and also substantially greater than the mean diameter of the circular spherical zone being formed.

In the present modification the knife edge 41' will provide circular sealing contact with the ring 48 in any of a plurality of spherical incremental zones lying radially outwardly from the inner diameter of the ring, the most forwardly located portions of the convex face 49 being of the same diameter as the inner diameter of the ring as indicated at 50. It is understood that the angular displacement permitted of the poppet axis with the axis of the bore 12 will limit contact of any point on the knife edge 41' to and not further radially inwardly than the inner diameter of the ring 48.

The poppet 31' will cooperate with the sealing ring 48 in a similar manner as that described in the first modification. The modification illustrated in Fig. 3 further emphasizes the requirement that the circular knife edge contact a radially outwardly and forwardly directed spherical incremental zone on a seating ring. The radially outwardly and forwardly directed convex face provided on such a seating ring may be considered as being composed of a plurality of incremental spherical zones or sections and thus any convex surface thus formed will provide a surface upon which a circular knife edge will be capable of having circular sealing contact.

It may be noted that ports 34 in the poppet skirt and passageways 27 have sufficient flow area to afford full capacity flow of fluid through the valve when the valve is in fully open or surge position.

It will be apparent that the freedom of movement of the poppet loosely fitted within the inlet bore as afforded by the rearwardly tapered skirt and the light weight construction of the skirt as compared to the head of the poppet provides a poppet immediately responsive to minute pressure changes. The circular seating contact of the circular knife edge carried by the poppet head with the circular convex face 21a of the ring provides a bubble-tight seal for any position the poppet may assume in response to pressure changes.

All modifications or changes coming within the scope of the appended claims are embraced thereby.

We claim:

1. A check valve responsive to minute changes in fluid pressure comprising: a separable body including an inlet portion provided with an inlet bore and a discharge portion provided with a discharge bore; means for interconnecting said body portions with their bores in alignment and with the inner end of the inlet bore spaced from the discharge bore in the discharge portion; a poppet comprising a skirt having a lightweight ported cylindrical wall, said skirt being tapered toward the outer end of the inlet bore and loosely fitting the inlet bore for reducing frictional engagement of the skirt with the inlet bore when the axis of the skirt is misaligned with the axis of the bore, a head closing the inner end of the skirt and extending outwardly therefrom, a rearwardly directed lip carried by the outward extension of the head, said lip forming a circular rearwardly directed knife edge lying in a plane transverse to the poppet axis; an annular seating ring held by the inner end of the inlet portion, said annular ring being resilient and presenting a virtually convex radially outwardly facing zone to the knife edge, the diameter of the knife edge being greater than the mean diameter of such seating ring; whereby virtually all portions of the knife edge contact and are imbedded in the said convex zone of the seating ring even when the axis of the poppet skirt is not in alignment with the inlet bore; and light spring means biasing said poppet into seating ring.

2. A check valve responsive to minute changes in fluid pressure comprising: a separable body including an inlet portion provided with an inlet bore and a discharge portion provided with a discharge bore; means for interconnecting said body portions with their bores in alignment and with the inner end of the inlet bore spaced from the discharge bore in the discharge portion; a poppet comprising a tapered skirt having a lightweight ported cylindrical wall, said skirt loosely fitting the inlet bore, a head of heavy section closing the inner end of the skirt and extending radially outwardly therefrom, a rearwardly directed lip carried by the outward extension of the head, said lip forming a circular rearwardly directed knife edge lying in a plane transverse to the poppet axis; a soft resilient seating ring of circular section held by the inner end of the inlet portion, said circular knife edge having a diameter slightly greater than the mean diameter of the seating ring; whereby the poppet is virtually statically and dynamically balanced adjacent to the inner opening of the inlet bore when moving into closed relation to said inner opening whereby virtually all portions of the knife edge are impressed into the surface of the seating ring even when the axis of the poppet skirt is not in alignment with the inlet bore; and light spring means biasing said poppet into seating contact with the seating ring.

3. A check valve responsive to minute changes in fluid pressure comprising: a separable body including an inlet portion provided with an inlet bore and a discharge portion provided with a discharge bore; means for interconnecting said body portions with their bores in alignment and with the inner end of the inlet bore spaced from the discharge bore in the discharge portion; a poppet comprising a skirt having a lightweight ported cylindrical wall, said skirt being tapered and loosely fitting the inlet bore for limiting misalignment of the axis of the poppet with the inlet bore, a head closing the inner end of the skirt and extending outwardly therefrom, a rearwardly directed lip carried by the outward extension of the head, said lip forming a circular rearwardly directed knife edge lying in a plane transverse to the poppet axis; a soft resilient seating ring of circular section held by the inner end of the inlet portion, said circular knife edge having a diameter slightly greater than the mean diameter of the seating ring; and light spring means biasing said poppet into seating contact with the seating ring.

4. A check valve responsive to minute changes in fluid pressure comprising: a separable body including an inlet portion provided with an inlet bore and a discharge portion provided with a discharge bore; means for interconnecting said body portions with their bores in alignment and with the inner end of the inlet bore spaced from the discharge bore in the discharge portion; a poppet comprising a skirt having a lightweight ported cylindrical wall, said skirt being tapered and loosely fitting the inlet bore for limiting misalignment of the axis of the poppet valve with the inlet bore, a head closing the inner end of the skirt and extending outwardly therefrom, a rearwardly directed lip carried by the outward extension of the head, said lip forming a circular rearwardly directed knife edge lying in a plane transverse to the poppet axis; an annular resilient seating ring held by the inner end of the inlet portion, said annular ring presenting a convex radially outwardly and forwardly facing zone to the knife edge; the diameter of the knife edge being greater than the diameter of the most forwardly directed portion of the seating ring; whereby virtually all portions of the knife edge are imbedded in said convex zone of the seating ring even when the axis of the poppet skirt is not in alignment with the inlet bore; and light spring means biasing said poppet into seating contact with the seating ring.

5. In a check valve comprising a hollow valve body having an inlet portion and an outlet portion, and a loosely fitting biased movable poppet operable within the valve body, the provision of: a seating ring of resilient material carried by the inlet portion within the valve body and provided with a radially forwardly and outwardly facing convex zone encircling the axis of the inlet portion; and a circular rearwardly directed knife edge carried by the poppet, said edge lying in a plane perpendicular to the axis of the poppet; said knife edge having a diameter greater than the diameter of the most forward portion of the convex zone of the seating ring and arranged for circular sealing imbedded contact with said zone and means on the poppet limiting lateral movement of the knife edge to engagement with the convex zone in any position of the poppet with respect to the inlet portion when closed.

6. In a check valve comprising a hollow valve body having an inlet portion and an outlet portion, and a loosely fitting biased movable poppet operable within the valve body, the provision of: a resilient seating ring carried by the inlet portion within the valve body and provided with a radially forwardly and outwardly facing convex zone encircling the axis of the inlet portion; and a circular rearwardly directed knife edge carried by the poppet, said knife edge having a diameter greater than the diameter of the most forward portion of the convex zone of the seating ring and arranged for circular sealing imbedding contact with said zone, and means on the poppet limiting lateral movement of the knife edge to engagement with the convex zone in any misaligned position of the poppet with respect to the inlet portion when closed.

7. In a check valve: a valve body comprising a hollow discharge portion and a bored inlet portion extending therewithin; a spring biased poppet operable in said valve body for closing and opening the inlet portion in response to flow of fluid between the inlet portion and the discharge portion; a resilient seating ring carried on the inner end of the inlet portion, said ring having circular convex seating surface; said poppet being provided with a rearwardly directed circular knife edge adapted to be imbedded into the convex seating surface for circular sealing engagement therewith even when the axis of the poppet is misaligned with the axis of the inlet portion.

8. A valve as defined in claim 7 wherein the poppet is provided with a ported skirt movable within the inlet portion and having a rearwardly tapered outer surface affording a loose fitting relationship of the skirt within the inlet portion for limiting lateral and angular movement of the axis of the poppet with respect to the axis of the inlet portion.

9. In a check valve responsive to minute pressure changes and including a valve body having inlet and outlet body portions, the combination of: annular means on said inlet body portion forming an inner opening for the inlet portion; an annular seating member of resilient material carried by said annular means and provided with a forwardly and radially outwardly directed convex seating zone; an axially movable, hollow valve element operable within said annular means in loosely fitting relation thereto, said valve element having a head of heavy section and an elongated ported tapered skirt of light section, said head overlying said seating zone and carrying a circular knife edge opposed to said zone, the knife edge lying in a plane perpendicular to the axis of the valve element; light spring means biasing said valve element toward said resilient seating zone; said tapered skirt being cooperable with the annular means for limiting axial misalignment of the valve element with the annular means, whereby the knife edge is adapted to be imbedded in the convex seating zone in a circular line in any closed position of the valve element.

10. A poppet valve element for use in a check valve responsive to minute changes in pressure, comprising: a ported elongated tapered hollow skirt of light section having an opening at one end; a head of heavy section closing the other end of said skirt and having a radially outwardly directed annular extension, a rearwardly directed lip carried by said extension, said lip forming a circular rearwardly directed knife edge which lies in a plane transverse to the axis of said skirt.

JAMES R. CLARK, Jr.
RALPH W. JAMES.

References Cited in the file of this patent
UNITED STATES PATENTS

| Number | Name | Date |
|---|---|---|
| 455,633 | Messinger | July 7, 1891 |
| 2,353,161 | Heigis | July 11, 1944 |
| 2,447,729 | Bertea | Aug. 24, 1948 |
| 2,538,364 | James | Jan. 16, 1951 |